United States Patent [19]

Thierer et al.

[11] 4,099,631

[45] Jul. 11, 1978

[54] SCRAPER

[75] Inventors: Georg Thierer, Bad Schönborn; Hans Dolinsek, Stuttgart, both of Germany

[73] Assignee: Firma Johannes Fuchs, Ditzingen, Germany

[21] Appl. No.: 715,431

[22] Filed: Aug. 18, 1976

[30] Foreign Application Priority Data

May 15, 1976 [DE] Fed. Rep. of Germany ....... 2621704

[51] Int. Cl.[2] .............................................. B65G 65/28

[52] U.S. Cl. ................................... 214/10; 91/391 R; 198/517; 212/39 MS; 214/152

[58] Field of Search .................... 214/10, 17 DB, 152; 198/509, 517; 212/39 MS; 91/391 R

[56] References Cited

U.S. PATENT DOCUMENTS

| | | | |
|---|---|---|---|
| 1,705,626 | 3/1929 | Rosenberg | 91/391 R X |
| 2,402,419 | 6/1946 | Larson | 91/391 R |
| 3,495,723 | 2/1970 | Reymann | 214/10 |
| 3,556,317 | 1/1971 | Vidal | 214/10 |
| 3,851,749 | 12/1974 | Vidal | 214/10 X |
| 3,908,838 | 9/1975 | Hanss | 214/10 |

FOREIGN PATENT DOCUMENTS

| | | | |
|---|---|---|---|
| 2,118,896 | 4/1971 | Fed. Rep. of Germany | 212/39 MS |

*Primary Examiner*—Drayton E. Hoffman
*Assistant Examiner*—George F. Abraham
*Attorney, Agent, or Firm*—Wigman & Cohen

[57] ABSTRACT

This disclosure relates to an automatically controlled scraper for moving particulate material onto a radial or star feeder for distribution thereby. The scraper includes a scraper bucket suspended from a radially extending arm. The bucket is connected to both a digging cable line and a lifting cable line, each of which is in turn connected to a suitable winch. The winches are controlled by clutches and brakes, each of which are optionally activated by interconnected automatic and manual control elements, whereby operation may be selectively changed from automatic to manual at the discretion of the operator.

8 Claims, 5 Drawing Figures

Fig.1.
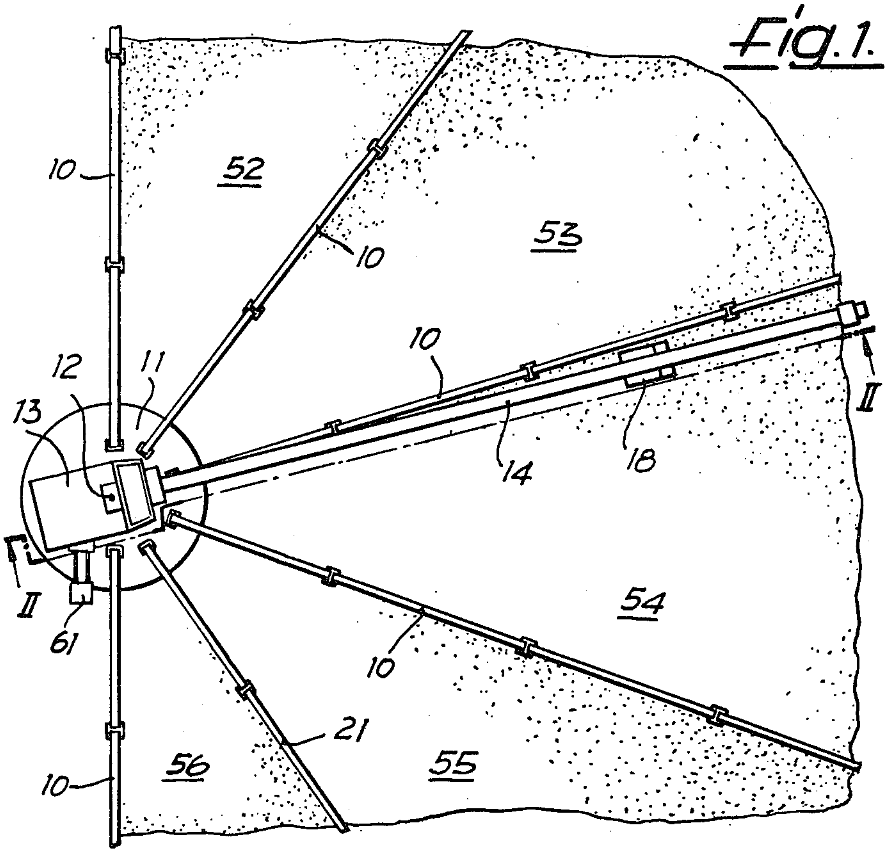
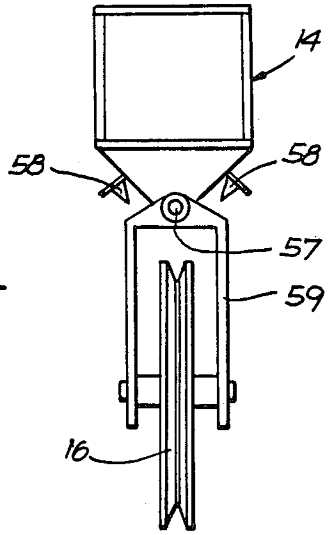
Fig.5.

SCRAPER

BACKGROUND OF THE INVENTION

This invention relates to the material handling art, and more particularly to an automatically-controlled radial scraper for moving accumulated loose or particulate material, such as aggregate, onto a radial or star feeder for subsequent distribution thereby.

The particulate material is usually delivered to the star feeder in trucks and dumped into bins or boxes which surround and fan out from the star feeder in a star-shaped pattern. The scraper is mounted on the star feeder and is utilized to convey the dumped material from the periphery of the pile thereof radially inwardly adjacent the base of the feeder. The scraper must be swingably mounted such that it may be positioned over selected boxes of the loose material for operation therein. The star feeder is usually provided with inlet valves so that, the particulate material, piled up adjacent the base thereof, may be admitted into the interior of the feeder.

Specifically, therefore, the invention concerns an automatically-controlled scraper for moving accumulated loose material onto a radial or star feeder provided with a platform, arranged on a supporting construction, the scraper including an arm for a guide roller of a hoisting cable line, one end of which is connected to a scraper bucket, and the otherend of which is connected to a lifting winch which is arranged on the platform together with a digging winch having a digging cable line connected to the other end of the scraper bucket, and a motor to drive both winches with automatically-controlled power-controlled means to couple the winches to the motor and to actuate the winch brakes.

In the case of prior art scrapers of this type, it cannot be avoided that the automatic control of the power-controlled means will, at times, fail. The prior art automatically-controlled scrapers can thus not be used in such cases without great risk, because under certain circumstances the feed of the aggregate or loose particulate material moved by the scraper cannot be interrupted. If, for example, a load-bearing concrete object is being reinforced with concrete, then the feed of the aggregate which is conveyed by the scraper into the star feeder may not be interrupted, since otherwise the concrete object does not receive the required load-carrying capacity.

For this reason, in cases where reliability of operation of the scraper is mandatory, scrapers are used in which the clutches and brakes can be actuated manually, directly by operating personnel. Experience has shown that such scrapers have very high reliability. However, scrapers of this type have the disadvantage that the person who is operating the scraper is completely occupied with it.

SUMMARY OF THE INVENTION

In view of the foregoing, it should be apparent that a need exists in the art for a scraper that incorporates the flexibility and efficiency of a automatically-controlled scraper with the reliability of a manually-operated scraper.

The primary object of the invention, therefore, is to provide an automatic scraper that can be directly actuated manually at any time, so that the scraper operation need not be interrupted even in the event of failure of the automatic control system. Also, it should be possible to manufacture the scraper with a minimum expenditure of money and material.

This problem is solved according to the instant invention in that a manually, directly actuated clutch or brake is provided to engage the motor in the lifting winch and digging winch and the brakes of both winches, and that the automatically-controlled power controlled means engage the manually actuated members of the clutches and brakes.

Due to the fact that clutches and brakes are provided for both winches to engage the motor on the lifting winch and digging winch, the cable lines can be connected with both winches so that, with a revolution of the motor in the same direction, they always work in the winding up direction, so that unwinding from a winch can take place during winding up with another winch.

Due to the fact that the clutches and the brakes are directly manually actuated, a scraper is provided which has the reliability of prior art scrapers, in which the clutches and the brakes are actuated only directly, since with the failure of the automatic control and of the automatically-controlled power-controlled means, an operator can take over manual control of the scraper. Moreover, tests have shown that the automatically-controlled operation of the scraper according to the invention can be almost completely adapted to manual operation, so that it is also possible to slip the scraper bucket forward out over the radius of action of the arm, which only very skilled scraper operators can do manually. Thus, the radius of action of the scraper is increased and the possibility is provided to slip the scraper bucket out over the loose particulate material which is heaped up on trucks. Another advantage of the invention consists in the fact that it provides the possibility of adapting present scrapers, having manually directly-actuated clutches and brakes, for fully automatic operation as well, whereby the reliability of the manual operation is maintained.

In a preferred embodiment of the invention, it is provided that the brakes of the lifting winch can be switched to at least two braking levels with different predetermined braking force values. The result is that the lifting winch is blocked at the first braking level not only by full braking, but braking can be performed at a second braking level to avoid a slack line during the digging stroke with a reduced braking force. But it is also possible with the invention to achieve an improved automatic control of the scraper bucket by further braking levels. Thus for example, at a third braking stage, at which the lifting winch is braked more strongly than at the second braking stage, it is possible to draw the scraper bucket over an empty storage area without it sinking down into the empty area, which is not possible in the case of prior art, automatically controlled scrapers, and which is of greater importance for the complete filling of the storage area.

The adjustability of the brakes for the winches to two, three or more braking stages can be achieved by providing pneumatic or hydraulic cylinders as power-controlled means for the brakes, in which the pressure chamber can be relieved by the use of one, two or more reducing valves so that the full braking pressure can be reduced to one, two or more stages, so that the result is two or three or more braking levels including full braking.

The invention works especially advantageously with an embodiment in which the arm, together with the scraper bucket carried on it, can be moved laterally over dividing walls of boxes to a position over a selected box where the scraper bucket can be lowered into the selected box. A drive, controllable by the automatic control system, is provided for the lateral movement of the arm, which also can be actuated by a manual switch. With this design, the lateral movement of the arm can be optionally controlled either automatically or manually, simultaneously with the optionally automatic or manual control of the cable winches.

The invention also concerns a method for automatic control of the lowering movement of a scraper bucket for a scraper provided according to the invention.

Where the scraper bucket must be lowered into a box after the lateral movement of the arm from its position over an adjacent box, the scraper bucket will oscillate laterally due to the movement of the arm. Since the scraper bucket must be lowered as much as possible directly beside the divider wall separating adjacent boxes from each other, the control of the scraper bucket must be set up in such a manner that a pause is made after conclusion of the lateral movement of the arm, which is of such duration that the scraper bucket will stop oscillating, so that it can be lowered into the desired box in a vertical plane, directly beside the dividing wall. These pauses which are required to lower the scraper bucket are relatively long and during the course of the day add up to a considerable idle time, which considerably impairs the scraper efficiency.

Thus, another object of the invention is a method for automatic control of the lowering movement of the scraper bucket which completely avoids or at least minimizes these pauses.

This problem is solved according to the invention by the fact that the lowering movement of the scraper bucket is initiated immediately after the conclusion of the lateral movement of the arm at a point in time where the scraper bucket finds itself in a predetermined phase position of this lateral oscillating movement suitable for perfect lowering, first during its lateral oscillating movement. The result is that the lowering of the scraper bucket, despite its lateral oscillation, takes place at the earliest possible point in time, and it is assured that, despite its oscillating movement, the scraper is lowered surely into the desired box. The suitable phase position can be determined automatically in a known way by sensors which determine the actual position of the scraper bucket, e.g., by an electrical position switch arranged on a scraper bucket, by stress measuring instruments, which measure the magnitude and direction of the stresses in the line and/or in the line guide and/or in the bearing construction of the arm caused by the lateral oscillation movement of the scraper bucket, or by means of photo-detectors.

The invention thus also concerns scrapers which are equipped with suitable sensors.

The method of the invention can be carried out in a simplified manner so that the time interval between the point in time of initiating the lowering of the scrapers to the point in time of concluding the side movement of its arm is determined by tests and the lowering of the scraper is delayed by this time interval after conclusion of the lateral movement of the arm is triggered. This creates the possibility of carrying out the control of the lowering movement of the scraper in a very simple manner, since only a delay switch is necessary to trigger the lowering movement of the scraper bucket, which is triggered by the conclusion of the lateral movement of the arm and its delay is adjusted to the determined time interval. Accordingly, the invention refers to a scraper equipped with such a delay switch.

With the above and other objects in view that may become hereinafter apparent, the nature of the invention will be more clearly understood by reference to the attached drawings, the following detailed description thereof, and the appended claimed subject matter, wherein:

BRIEF DESCRIPTION OF THE DRAWINGS

FIG. 1 is a fragmentary plan view of a start feeder provided with the radial scraper of this invention and depicts partitioned boxes, fanning-out from the star feeder, which contain the particulate material;

FIG. 5 is an enlarged end view of the scraper arm illustrated in FIG. 1, and depicts a guide pulley over which the scraper bucket lifting cable is supported.

DETAILED DESCRIPTION OF PREFERRED EMBODIMENT

Figure 2:
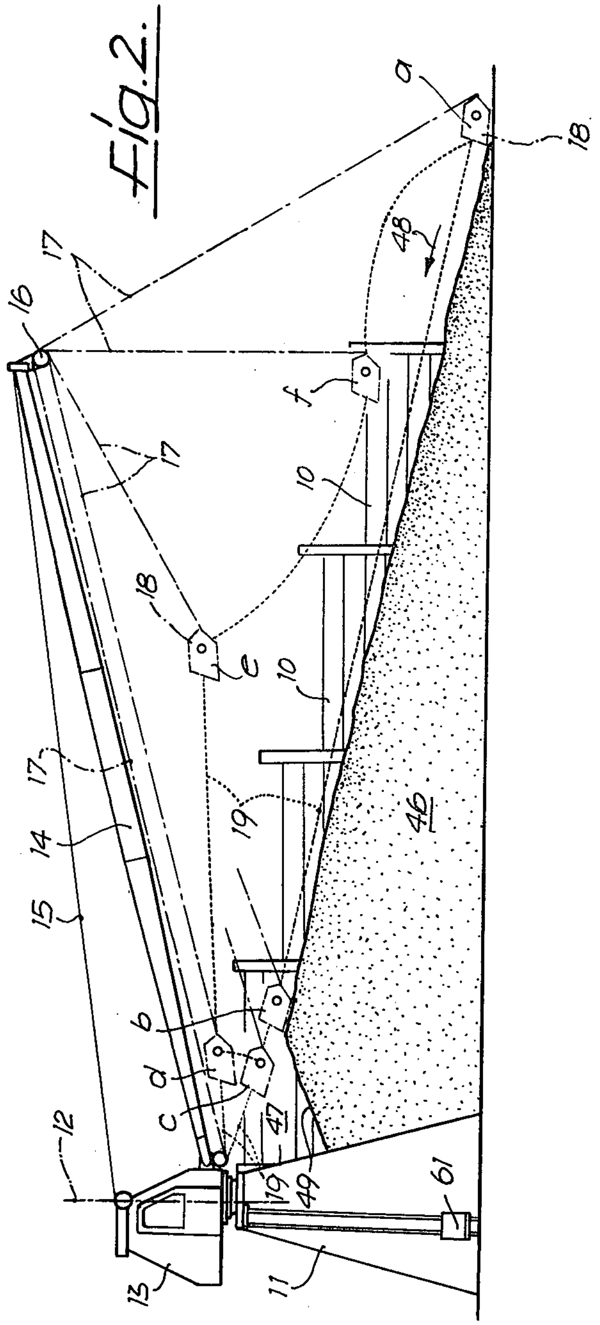
FIG. 2 is a cross-section view taken along line II—II of FIG. 1, and depicts the radial scraper movable through various operating positions over a pile of particulate material.

Referring now to the drawings in detail, there is illustrated in FIG. 1 an automatically-controlled radial scraper constructed in accordance with this invention including a support 11 designed as a star feeder. The star feeder includes radial dividing walls 10 which extend outwardly therefrom and define sector boxes 52–56. As seen most clearly in FIG. 2, the scraper includes a scraper bucket 18 which scrapes the loose material or aggregate, heaped in a pile 46 around the star feeder, from the periphery thereof radially inwardly adjacent the support 11. When a valve (not shown) of the star feeder is open, the aggregate material piled up adjacent the support 11 in a storage area designated 47 (FIG. 2) is emptied into the interior of the support 11 of the star feeder. The scraper thus has the task of continuously re-filling the storage areas 47, surrounding the support 11, so that when the star feeder is opened the aggregate material surrounding the base thereof is always available to flow inwardly into the interior of the feeder.

The radial scraper of this invention includes an operator's cabin 13 which is mounted on the support 11 and is rotatable about a vertical axis 12. The cabin 13 carries an arm 14 which is rotatable about a horizontal axis. The free end of the arm 14 is suspended from the cabin 13 by means of a cable line 15.

On its free end, the arm 14 supports a guide roller 16 for a hoisting cable 17 (represented by dashed lines), which is connected to the rear end of a scraper bucket 18. The front end of the bucket 18 is connected with the one end of digging cable 19 (represented by a dotted line), the other end of which is fastened to a digging winch 21, which is rotatably mounted on a common axis 20 (FIG. 4) with a hoisting winch 22. A sprocket wheel 25, driven by means of a motor 23 through a chain 24, is rotatably mounted between the two winches and is selectively engageable through clutches 26, 27 with the digging winch 21 or with the lifting winch 22. The clutches, 26 and 27, can be actuated by turning thrust nuts (not shown) which are mounted on both ends of the axis 20. For this purpose, the winches 21, 22 are not only rotatable, but are axially shiftable on axis 20, and are urged by the force of springs (not shown) over axial thrust bearings (not shown) against the thrust nuts. By turning the thrust nuts through a predetermined angle, the desired winch is urged against sprocket wheel 25, and by means of this coupling, the clutch is engaged.

Hand levers 31 and 32 are provided on both sides of a driver's seat 29, located in the cabin 13, for turning the thrust nuts and thus for actuating clutches 26 and 27. Pneumatic cylinders 33 and 34 engage against each of these hand levers 31 and 32, which can be optionally actuated as a power-controlled means by an automatic control system (not shown), so that the actual clutch is engaged or disengaged from its respective pneumatic cylinder.

Figure 3:
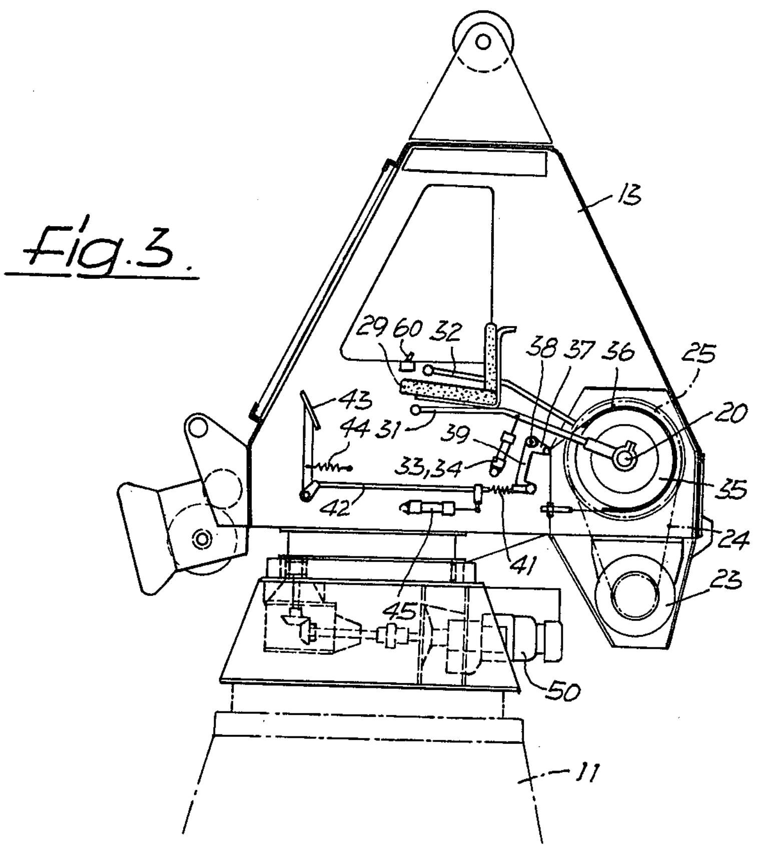
FIG. 3 is an enlarged vertical cross-sectional view taken through the operator's cabin of the scraper illustrated in FIG. 1, and depicts the various control elements for the scraper.

Brake drums 35 are provided on the outer ends of each winch 21, 22, which are coupled to brake bands 36. The free ends of the bands 36 engage one arm 37 of a two-arm lever 37, 39 which is rotatable around a horizontal axis. The second arms 39 are connected by means of springs 41 with rods 42, serving as transfer elements, onto pedals 43. Pedals 43 are kept in the position shown in FIG. 3 by springs 44, in which the brake is inoperative.

With both of the brakes, a pneumatic cylinder 45 engages on rod 42 in addition to pedal 43, by means of which the brake can be actuated in the same way with pedal 43 and which likewise can be actuated as a power-controlled means by the automatic control system.

Each of the winches 21, 22 is provided with a pneumatic cylinder 45. The pneumatic cylinder 45 for digging winch 21 is provided with a reducing valve (not shown) by means of which, with braking, the pressure in the pressure chamber of the cylinder 45 can be reduced to an adjustable value. The pneumatic cylinder 45 for the lifting winch 22 is provided with two reducing valves, so that the pressure in its pressure chamber can be reduced to two different adjustable values. Both cylinders are selected and arranged in such a manner that full braking is achieved in their respective pressure chambers at full pressure. Digging winch 21 can, accordingly, be braked fully or with a reduced braking pressure, thus having two braking stages. Accordingly, the lifting winch 22 can be braked with three braking stages by its pneumatic cylinder 45. These reducing valves are likewise actuable by the automatic control system.

By suitable selection of the spring constant of the springs 41, the displacement required to achieve a certain change of the braking force of rod 42 can be widely varied. This has the advantage for manual operation, that various braking stages can be adjusted comfortably and precisely due to the relatively large throw of the pedals 43. For operation by means of the pneumatic cylinder 45, there is the advantage that the different braking stages are adjusted smoothly and without jolts from the outset.

It is especially advantageous that when releasing the brakes, the braking force is not released suddenly, which would be unavoidable without the use of springs 41 due to the transition from the residual friction of the brake-actuating media to the movement friction (stick-slip effect). Also, when suddenly actuating the rod 42, the use of springs 41 permits the braking effect to be changed only relatively slowly due to the relatively long path of the rod 41, so that impacts are reduced.

Another advantage which results from the use of springs 41 is that when the rod 42 is moved suddenly into braking position during a scraping operation of the bucket 18, braking cannot take place suddenly, for the above reasons, so that the impact of the scraping is flattened out. Since such a scraping takes place with each working cycle of the scraper, the effect of spring 41 is particularly important for the workin life of the scraper.

Figure 4:
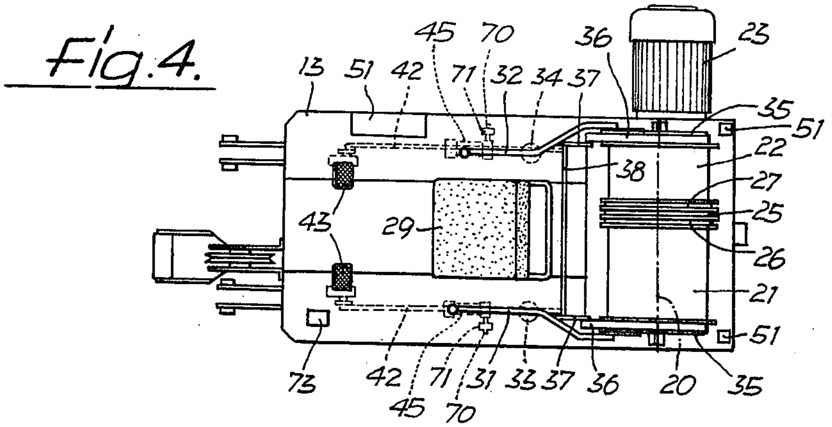
FIG. 4 is a horizontal sectional view taken through the cabin illustrated in FIG. 3.

To measure the angles of rotation of winches 21 and 22, and thus the line lengths wound up or unwound on the winches, a measuring instrument 51 is provided, only indicated in FIG. 4, for each winch 21 and 22, which at certain line lengths transmits signals to the control mechanism, on the basis of which signals then shifts the brakes and engages the clutches according to the operational program described hereinafter. The measuring instruments 51 then are displacement recorders which measure the length of the path traversed by the scraper.

With the position of the scraper bucket designated with the letter "*e*" in FIG. 2 with the arm 14 lifted, the arm 14 can be transversed together with the scrapper bucket over the dividing walls 10. A drive 50 is provided for the rotating motion of the arm 14, as well as for its rotating motion within a box, which can be turned on and off by an automatic control which can be controlled by a manually actuated switch 60 from cabin 13 independent of the automatic control.

The guide roller 16 is rotatably mounted in a yoke 69 which is pivotally mounted around axis 57 (FIG. 5). A position switch 58 is arranged on each side of the arm 14, which is actuated by a certain phase position of the lateral traversing movement of the scraper bucket and thus of the guide roller 16 from yoke 59 supporting the guide roller 16. By means of this, both position switches 58 act as sensors to determine the phase length of the lateral pendulous movement of the scraper bucket 18.

Operational Program

In the starting position, the scraper bucket 18, indicated by dotted lines, is in the position designated by the letter "*a*" in FIG. 2, in which both brakes 35, 36 are engaged and both winches 21 and 22 are locked in place. The clutches 26 and 27 are disengaged.

In the case of digging stroke, in which the scraper bucket 18 is moved onto the slope of the pile 46 shown in FIG. 2 in the direction of arrow 48, the clutch 26 of winch 21 is engaged and the clutch 27 of lifting winch 22 is disengaged, so that by winding up digging cable line 19 onto winch 21, the scraper bucket 18 is moved in the direction of arrow 48. So that the lifting cable 17 is not freely unwound from its winch 22, but can be unwound only under force, the brake 35, 36 of lifting winch 22 is adjusted to the first braking level with the smallest braking force. As soon as the scraper bucket 18 has reached the position designated with the letter "*b*" in FIG. 2, on the edge 49 of the storage area 47, the brake of the lifting winch 22 is shifted to the second braking level, in which such a great braking force is generated that the lifting cable line 17 is in a position to bear the weight of the scraper bucket 18 together with the cable line 19, so that with further movement in the direction of the arrow 48, it is also moved over the empty storage area 47, without sinking down into it.

As soon as the scraper bucket 18 has reached the position designated with the letter "*c*" in FIG. 2 over the storage area 47, at the end of the digging stroke, both winches 21 and 22 are fully braked and the digging winch clutch is disengaged.

Subsequently, the clutch 27 is engaged for lifting winch 22. Simultaneously, the brake for lifting winch 22 is released so that the scraper bucket 18 is lifted onto a circular line of lifting cable line determined by the length of digger cable line 19 into the position designated. Subsequently, the brake of digging winch 21 is shifted over to the braking level with reduced braking pressure, so that the scraper bucket 18 is moved into the position designated "*e*" by the pull of lifting cable line 17. The braking pressure of the digging winch brake is adjusted to such a reduced value that the scraper bucket 18 is carried by both cable lines and can not sink below position *e*.

As soon as position e has been reached, the lifting winch 22 is released from the drive and is fully braked, and the brake of the digging winch 21 is completely released so that the scraper bucket 18 is moved in an accelerated movement onto a circular path from position e into the position designated "*f*". As soon as it has reached position *f*, the brake of lifting winch 22 is completely released so that the scraper bucket 18 is moved forward on a ballistic path over the range of the arm 14. As soon as the digger cable line 19 has reached the length required for position *a*, the digging winch 21 is fully adjusted and the brake of the lifting winch 22 is adjusted to one of the two reduced braking levels, so that the scraper bucket 18, braked at the desired position, falls to the ground in position *a*, where the digging winch 21 and the lifting winch 22 are fully braked, so that the operating cycle can be repeated. The operation of the scraper, however, can also be started with any other position of the scraper bucket 18. It is especially advantageous if the scraper bucket 18 is moved forward from position f into position a over the range of the arm 14, in the given case over trucks loaded with the aggregate or particulate material.

After the scraper has completed its work in a box, e.g., in box 53, the arm 14 with the scraper bucket 18 carried on it in position *e*, is moved out of position over the box 53 into a position directly adjacent the divider wall 10 over box 54. In order to carry out the scraper operation in this box, the scraper bucket 18 must be lowered down into the box 54. By means of the rotating motion and the subsequent stopping of the arm 14, a pendulous motion of the scraper bucket 18 is initiated which prevents a sure, automatic lowering of the scraper bucket 18 into box 54. Consequently, the bucket 18 might swing back over the box 53, or get hung up on the dividing wall 10.

This is prevented by the method of the invention in that the lowering motion of the scraper bucket 18 is initiated immediately after the conclusion of the swinging movement of arm 14 at a point in time in which the scraper bucket 18, during its lateral pendulous movement, first finds itself in a predetermined phase position of this lateral pendulous movement suitable for optimum lowering.

In the disclosed embodiment of the radial scraper, the point in time in which the scraper bucket 18 is in the desired phase position is determined by the two position switches 58 (FIG. 5) serving as sensors, which initiate the lowering movement of the scraper bucket automatically when the scraper bucket is in this phase position.

Since the arm 14 must be moved in the opposite direction over the radial boxes 52–56 after scraping in all boxes for the next working step, it is desirable to provide two position switches 58, of which one position switch determines the most favorable phase position with the movement of the arm in the one rotational direction and the other position switch determines the most favorable phase position with the rotational movement of the arm in the other rotational direction.

In the case of an alternate embodiment, a tension measuring instrument, not shown in the drawing, can be provided which measures the value of the tension in the cable line caused by the lateral pendulous motion, or in the bearing construction of the arm 14. Wire strain gauges can be provided as a tension measuring instrument. This tension measuring instrument can be used in the same way as the above-described position switch.

With yet another embodiment, a photo-detector can be provided as a sensor which is triggered when the scraper bucket is located in the desired phase position. In this case as well, it is desirable for the above reasons, to provide two detectors.

The phase position of the lateral pendulous movement suitable for optimum lowering of the scraper bucket 18 can be determined directly by tests. It is also possible to determine after which interval of time from the point in time the pivoting movement of the arm is concluded, the scraper bucket 18 assumes the phase position of its lateral pendulous motion suitable for optimum lowering. On the basis of this determination, with a simplified embodiment of the scraper, a delay switch can be present to trigger the lowering movement of the scraper bucket, instead of the above-described sensor, which is set off by conclusion of the pivoting movement of the arm 14 and after the conclusion of a determined time interval introduces the lowering movement of the scraper bucket from position *e* into position a.

The above-described operation is controlled by an electronic or fluid-program control not shown in the drawings, where the signals for this control are transmitted by the measuring devices 51 as a function of the actual cable lengths wound up on the winches. When the control, or when one of the pneumatic cylinders functioning as a power-controlled means fails, the control of the scraper can be directly carried out manually by one operator, so that the functional capability of the scraper is guaranteed also for these shut-down times.

In the described embodiment of the invention, the released condition of both winch brakes corresponds to the rest position of the brake pedals 43 determined by springs 44, so that the brakes are engaged when actuating the pedals 43. This arrangement is not compulsory, however.

The full braking effect of the brake actuated by the pedal can also be set to the rest position of pedals 43. In this case, the braking force is generated by spring 44 and when the pedals 43 are actuated, both brakes are released. Both springs 41 work in the same above-described advantageous manner. This arrangement has the advantage, compared to the illustrated arrangement, in that when a final control element for a brake fails, the scraper bucket 18 cannot fall down suddenly uncontrolled by releasing of the brake, but is held fast by tightening the uncontrolled brake in its position until an operator takes over control of the scraper.

Since the automatically controlled scraper according to the invention must be as reliable as a manually, directly-actuated scraper, a motor driven hoist 61 (FIG. 2) is provided for the operator for manual control of the scraper. This avoids the same time being lost with failure of the automatic control or of a power-controlled means until the operator can climb into the (5–6 m) high cabin 13. The hoist 61 and its drive are arranged on the support 11. But they can also be arranged on the cabin 13, rotatable with it.

According to safety regulations, when unloading a truck into one of the radial boxes of an automatically controlled scraper, the operation of the scraper must be stopped when the scraper is operational in a radial box other than the one into which the truck is being emptied. However, the feeding of the loose material into the radial boxes is rather lengthy, so that in the case of automatically controlled scrapers, there is a great time loss, since each time loose material is fed to a box from a truck, the scraper operation must be interrupted for a considerable length of time.

However, in the embodiment of the invention where the hoist 61 is provided for an operator on the support 11, each time a truck is emptied into a radial box the operator can immediately climb into the cabin 13 and take over the manual control of the scraper, so that the scraper operation need not be interrupted.

The winch motor 23 is provided with a protective circuit breaker which shuts it off in the case of an overload, e.g., when the scraper bucket 18 gets hung up on a dividing wall 10.

In order to prevent this switching off from occurring with surging current when a motor is turned on or off with only transitory increases in resistance during the digging stroke, a delay element is provided. By means of this delay element, the motor 23 is first shut off when the overload has reached a minimum period of time, at which the motor is not damaged by the overload, by means of which, however, unnecessary shutdowns are avoided. The most practical period of overload can be determined by tests for each type of scraper.

The invention is described above with the example of a radial scraper. However, it is also advantageously applicable with other, non-radial scrapers, e.g., scrapers in which the support construction 11 is designed as a back wall according to FIG. 2 which extends vertically to the drawing plane of FIG. 2 and on which the cabin 13 is movable with the arm 14 vertical to the drawing plane of FIG. 2, and the divider walls 10 extend parallel to the drawing plane of FIG. 2.

The spring 41, which transmits the manual or motor-actuating force from pedal 43 or from power-controlled means 45 against the brake band, functions as a damper, which damps the initiation of the operating force and thus the initiation of the braking effect. Instead of a spring 41, or even in addition to it, a restrictor 71 can be provided as a damper in the pressurized air feed line 70 of pneumatic cylinder 45, which also damps initiation of the operating force.

In the case of the above-described preferred embodiment, the positions *a, b, c, d, e* and *f* of the scraper bucket are determined by the measuring devices 51 serving as displacement recorders. Instead of displacement recorders, however, measuring instruments 73 can also be provided to measure the time, since due to the motorized compulsory drive, each position of the scraper bucket is reached in a predetermined point in time. It can also be of advantage to use different measuring instruments, namely a displacement recorder and a chronometer combined for different positions.

In the case of a preferred embodiment which has proven to be especially advantageous, the different positions of the scraper bucket are determined as follows:

position *b* by a measuring instrument 51 of the digger winch 21;

position *c* by measuring instruments 51 of the digger winch and the lifting winch 21 and 22;

position *d* by the measuring instruments 51 of the digger and lifting winch 21 and 22;

position *e* by the measuring instruments 51 of the digger and lifting winch 21 and 22;

position *f* by the measuring instrument 73; and position *a* by the measuring instrument 73.

Due to the fact that the positions c, d and e are determined by the measuring instruments 51 of both the digger and lefting winches 21 and 22, the scraping-bucket 18 then in suspension is prevented from falling down, since with the failure of one measuring instrument, the other will be operative.

Although only preferred embodiments of the invention have been specifically illustrated and described herein, it is to be understood that minor modifications could be made therein without departing from the spirit of the invention.

We claim:

1. Apparatus for scraping piled-up particulate material against a radial feeder comprising a scraper mounted on a support portion of said feeder, an arm pivotably mounted on said support, a scraper bucket suspended from said arm by a lifting cable line connected to a lifting winch, a digging cable line connected at one end thereof to said bucket and at the other end thereof to a digging winch, motor means for driving said winches, clutch means for connecting said winches with said motor means, brake means for braking said winches, manual control means for directly manually actuating said clutch means and said brake means through linkage means interconnecting said manual control means with said clutch means and said brake means respectively, power-controlled means for automatically actuating said manual control means, whereby manual and automatic operation are optionally selectable, said radial feeder including a plurality of divider walls extending outwardly therefrom defining a plurality of boxes adapted to contain the particulate material, said scraper bucket being movable along a path to convey the particulate material from the periphery thereof inwardly to a storage area adjacent said feeder and then return to the periphery of the pile of material, means for sensing various positions of said bucket along said path and for generating control signals in response thereto, said arm, together with said scraper bucket carried thereby, being laterally movable over said divider walls to a position over a selected box into which said scraper bucket is adapted to be lowered, an automatically controlled drive for laterally moving said arm, and at least one sensor means for initiating the lowering movement said scraper bucket in response to a predetermined phase position of the lateral pendulous movement of said scraper bucket.

2. Apparatus as defined in claim 1, said including a guide roller for said lifting cable line rotatably mounted on said arm, said sensor means including at least one position switch arranged on said arm for actuation at a predetermined phase position of the lateral pendulous movement of said scraper bucket.

3. Apparatus as defined in claim 1, wherein said sensor means includes a tension measuring instrument for measuring the magnitude and direction of the tension in the lifting cable line caused by the lateral pendulous movement of the scraper bucket.

4. Apparatus as defined in claim 3, wherein said tension measuring instrument is a wire strain gauge.

5. Apparatus as defined in claim 1, wherein said sensor means includes at least one photodetector.

6. Apparatus for scraping piled-up particulate material against a radial feeder comprising a scraper mounted on a support portion of said feeder, an arm pivotably mounted on said support, a scraper bucket suspended from said arm by a lifting cable line connected to a lifting winch, a digging cable line connected at one end thereof to said bucket and at the other end thereof to a digging winch, motor means for driving said winches, clutch means for connecting said winches with said motor means, brake means for braking said winches, manual control means for directly manually actuating said clutch means and said brake means through linkage means interconnecting said manual control means with said clutch means and said brake means respectively, powercontrolled means for automatically actuating said manual control means, whereby manual and automatic operation are optionally selectable, said radial feeder including a plurality of divider walls extending outwardly thereform defining a plurality of boxes adapted to contain the particulate material, said scraper bucket being movable along a path to convey the particulate material from the periphery thereof inwardly to a storage area adjacent said feeder and then return to the periphery of the pile of material, means for sensing various positions of said bucket along said path and for generating control signals in response thereto, said arm together with said scraper bucket carried thereby, being laterally movable over said divider walls to a position over a selected box into which said scraper bucket is adapted to be lowered, an automatically controlled drive for laterally moving said arm, and a time delay switch for triggering the lowering movement of said scraper bucket at the conclusion of the lateral movement of the arm, the delay of said switch being adjusted to a predetermined time interval.

7. In a method of controlling the operation of a radial scraper having a scraper bucket carried by an arm pivotable about a vertical axis to move the bucket over divider walls to operative positions over sector boxes defined by said walls so that the bucket may be lowered into selected ones of said boxes without striking or becoming hung-up on said walls, comprising the steps of:

(a) hoisting said bucket on a cable line carried by said arm to an elevation above the height of said walls;

(b) rotating said arm about said vertical axis through a predetermined angle so as to position said bucket over a selected sector box, said rotation imparting a lateral pendulous motion substantially normal to said arm to said bucket at the end of said cable line; and (c) lowering the bucket into the selected sector box;

the improvement comprising automatically initiating the lowering step upon conclusion of the rotating step after a time delay of predetermined duration, said time delay duration being calculated to permit lowering at the earliest occurring phase position in the lateral pendulous movement of the bucket at which the bucket is located in an optimum position for lowering into the sector box.

8. In a method of controlling the operation of a radial scraper having a scraper bucket carried by an arm pivotable about a vertical axis to move the bucket over divider walls to operative positions over sector boxes defined by said walls so that the bucket may be lowered into selected ones of said boxes without striking or becoming hung-up on said walls, comprising the steps of:

(a) hoisting said bucket on a cable line carried by said arm to an elevation above the height of said walls;

(b) rotating said arm about said vertical axis through a predetermined angle so as to position said bucket over a selected sector box, said rotation imparting a lateral pendulous motion substantially normal to said arm to said bucket at the end of said cable line; and (c) lowering the bucket into the selected sectorbox;

the improvement comprising automatically initiating the lowering step upon conclusion of the rotating step when said bucket is located in a predetermined optimum phase position of its lateral pendulous movement for lowering into the sector box.

* * * * *